US005752225A

United States Patent [19]
Fielder

[11] Patent Number: 5,752,225
[45] Date of Patent: May 12, 1998

[54] METHOD AND APPARATUS FOR SPLIT-BAND ENCODING AND SPLIT-BAND DECODING OF AUDIO INFORMATION USING ADAPTIVE BIT ALLOCATION TO ADJACENT SUBBANDS

[75] Inventor: Louis Dunn Fielder, Millbrae, Calif.

[73] Assignee: Dolby Laboratories Licensing Corporation, San Francisco, Calif.

[21] Appl. No.: 481,638

[22] Filed: Jun. 7, 1995

Related U.S. Application Data

[63] Continuation-in-part of Ser. No. 79,169, Jun. 18, 1993, Pat. No. 5,479,562, which is a continuation-in-part of Ser. No. 582,956, Sep. 26, 1990, Pat. No. 5,222,189, and Ser. No. 787,665, Nov. 4, 1991, Pat. No. 5,230,038, which is a division of Ser. No. 458,894, Dec. 29, 1989, Pat. No. 5,109,417, which is a continuation-in-part of Ser. No. 439,868, Nov. 20, 1989, abandoned, and Ser. No. 303,714, Jan. 27, 1989, abandoned, said Ser. No. 582,956, is a continuation-in-part of Ser. No. 458,894, and Ser. No. 439,868, which is a continuation-in-part of Ser. No. 303,714.

[51] Int. Cl.[6] .................................................. G10L 7/02
[52] U.S. Cl. ........................... 704/229; 704/203; 704/211
[58] Field of Search ........................... 395/2.1, 2.2, 2.38, 395/2.12, 2.13, 2.39; 704/201, 211, 229, 230, 203, 204

[56] References Cited

U.S. PATENT DOCUMENTS

| | | | |
|---|---|---|---|
| 4,184,049 | 1/1980 | Cochiere et al. | 395/2.38 |
| 4,216,354 | 8/1980 | Esteban et al. | 395/2.38 |
| 4,516,258 | 5/1985 | Ching et al. | 395/2.38 |
| 4,703,480 | 10/1987 | Westall et al. | 395/2.38 |
| 4,790,016 | 12/1988 | Mazor et al. | 704/203 |
| 4,914,701 | 4/1990 | Zibman | 704/203 |
| 5,109,417 | 4/1992 | Fielder et al. | 395/2.38 |
| 5,115,240 | 5/1992 | Fujiwara et al. | 704/205 |
| 5,142,656 | 8/1992 | Fielder et al. | 327/155 |
| 5,222,189 | 6/1993 | Fielder | 395/2.38 |
| 5,230,038 | 7/1993 | Fielder et al. | 395/2.38 |
| 5,323,396 | 6/1994 | Lokhoff | 395/2.1 |
| 5,479,562 | 12/1995 | Fielder et al. | 395/2.38 |

FOREIGN PATENT DOCUMENTS

| | | |
|---|---|---|
| 0176243 | 4/1986 | European Pat. Off. . |
| 0217017 | 4/1987 | European Pat. Off. . |
| 0289080 | 11/1988 | European Pat. Off. . |
| 0531538 | 3/1993 | European Pat. Off. . |
| 8804117 | 6/1988 | WIPO . |
| 8903574 | 4/1989 | WIPO . |

OTHER PUBLICATIONS

Crochiere, Webber, Flanagan, "Digital Coding of Speech in Sub-bands", *Bell System Tech. J.*, vol. 55, pp. 1069–1085, Oct. 1976.

Harris, "On the Use of Windows for Harmonic Analysis with the Discrete Fourier Transform," *Proc. IEEE*, vol. 66, Jan., 1978, pp. 51–83.

Esteban, Galand, "32 KBPS CCITT Compatible Split Band Coding Scheme," *ICASSP 1978 Conf. Proc.*, Apr. 1978, pp. 320–325.

Tribolet, Crochiere, "Frequency Domain Coding of Speech," *IEEE Trans. Acoust., Speech, and Signal Proc.*, vol. ASSP–27, Oct., 1979, pp. 512–530.

Brandenburg, Schramm, "A 16 Bit Adaptive Transform Coder for Real–Time Processing of Sound Signals", *Signal Processing II: Theories and Applications*, Elsevier Science Publishers, 1983, pp. 359–362.

Princen, Bradley, "Analysis/Synthesis Filter Bank Design Based on Time Domain Aliasing Cancellaton." *IEEE Trans. on Acoust., Speech, Signal Proc.*, vol. ASSP–34, Oct., 1986, pp. 1153–1161.

(List continued on next page.)

Primary Examiner—David D. Knepper
Attorney, Agent, or Firm—David N. Lathrop; Thomas A. Gallagher

[57] ABSTRACT

A split-band encoder and a split-band decoder use adaptive bit allocation to achieve high-quality audio coding at low bit rates. Bits are adaptively allocated to one or two subbands adjacent to a given subband based on signal levels in the given subband.

19 Claims, 8 Drawing Sheets

OTHER PUBLICATIONS

Stoll, Theile, "New Digital Sound Transmission Methods—How is Sound Quality Assessed," *Report, 14th Meeting of Audio Engineers*, Munich, Nov., 1986.

Brandenburg, "OCF—A New Coding Algorithm for High Quality Sound Signals," *ICASSP 1987 Conf. Proc.*, 1987, pp. 141–144.

Princen, Johnson, Bradley, "Subband/Transform Coding Using Filter Bank Designs Based on Time Domain Aliasing Cancellation," *ICASSP 1987 Conf. Proc.*, May 1987, pp. 2161–2164.

Johnson, Bradley, "Adaptive Transform Coding Incorporating Time Domain Aliasing Cancellation," *Speech Communictions.*, vol. 6, Elsevier Science Publishers, 1987, pp. 299–308.

Fielder, "Evaluation of the Audible Distortion and Noise Produced by Digital Audio Converters," *J. Audio Eng. Soc.*, vol. 35, Jul., 1987, pp. 517–534.

Schroeder, Platte, Krahé, "'MSC': Stereo Coding with CD–Quality and 256 kBit/Sec," *IEEE Trans. Consumer Electronics*, vol. CE–33, Nov. 1987, pp. 512–519.

Johnston, "Transform Coding of Audio Signals Using Perceptual Noise Criteria," *IEEE J. on Selected Areas in Communications*, vol. 6, Feb., 1988, pp. 314–323.

Brandenburg, et al., "Low Bit Rate Codecs for Audio Signals Implementation in Real Time," *AES Convention Preprint No. 2707*, 85th Convention, Los Angeles, Nov., 1988.

Brandenburg, Seitzer, "OCF: Coding High Quality Audio with Data Rates of 64 kBit/Sec," *AES Convention Preprint No. 2723*, 85th Convention, Los Angeles, Nov., 1988.

Rabiner et al., "Digital Processing of Speech Signals", pp. 295–303, Bell Labs, 1978.

Berunek, "Acoustics,", pp. 393–404; McGraw–Hill, 1954.

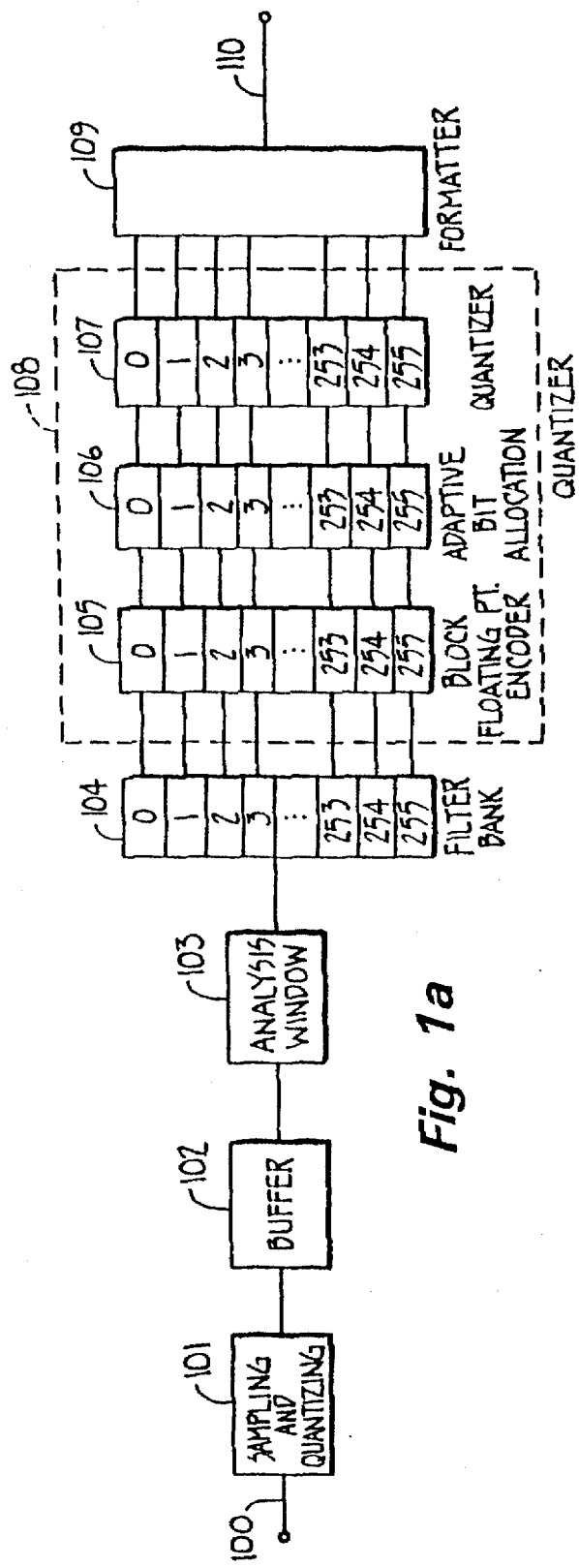
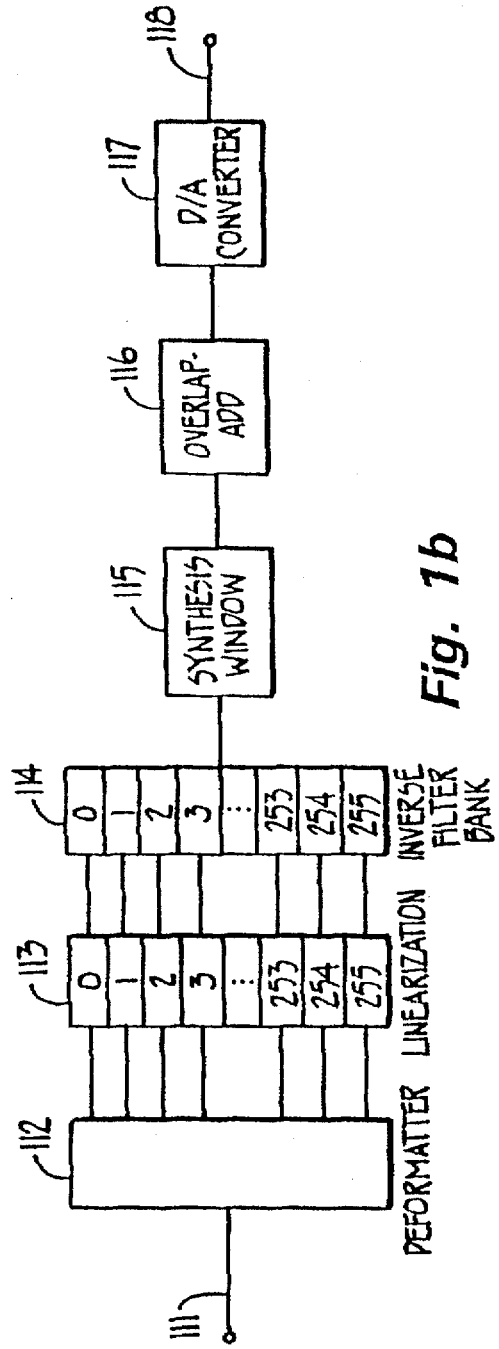
Fig. 1a
Fig. 1b

METHOD AND APPARATUS FOR SPLIT-BAND ENCODING AND SPLIT-BAND DECODING OF AUDIO INFORMATION USING ADAPTIVE BIT ALLOCATION TO ADJACENT SUBBANDS

CROSS-REFERENCE TO RELATED APPLICATIONS

This application is a continuation-in-part of application Ser. No. 08/079,169 filed Jun. 18, 1993, now U.S. Pat. No. 5,479,562 which is:

a continuation-in-part of application Ser. No. 07/582,956 filed Sep. 26, 1990, now U.S. Pat. No. 5,222,189, which is a continuation-in-part of application Ser. No. 07/458,894 filed Dec. 29, 1989, now U.S. Pat. 5,109,417, and application Ser. No. 07/439,868 filed Nov. 20, 1989, now abandoned, which was a continuation-in-part of application Ser. No. 07/303,714 filed Jan. 27, 1989, now abandoned; and a continuation-in-part of application Ser. No. 07/787,665 filed Nov. 4, 1991, now U.S. Pat. No. 5,230,038, which is a divisional of application Ser. No. 07/458,894 filed Dec. 29, 1989, now U.S. Pat. No. 5,109,417, which was a continuation-in-part of application Ser. No. 07/439,868 filed Nov. 20, 1989, now abandoned, and application Ser. No. 07/303,714 filed Jan. 27, 1989, now abandoned.

BACKGROUND OF THE INVENTION

The invention relates in general to high-quality low bit-rate encoding and decoding of signals carrying information intended for human perception such as audio signals, and more particularly music signals.

There is considerable interest among those in the field of signal processing to discover coding techniques which minimize the amount of information required to represent adequately a given signal. By reducing required information, signals may be transmitted over communication channels with lower bandwidth, or stored in less space. With respect to digital techniques, minimal informational requirements are synonymous with minimal binary bit requirements.

If coding techniques are applied to the full bandwidth, all quantizing errors, which manifest themselves as noise, are spread uniformly across the bandwidth. Split-band techniques which may be applied to selected portions of the spectrum can limit the spectral spread of quantizing noise. Split-band coding techniques are attractive because they can exploit psychoacoustic masking characteristics of the human auditory system. According to these characteristics, a dominant spectral component is more likely to mask or render inaudible another spectral component if the two components are within a critical bandwidth of one another. See generally, the *Audio Engineering Handbook*, K. Blair Benson ed., McGraw-Hill, San Francisco, 1988, pages 1.40–1.42 and 4.8–4.10.

Two known split-band techniques, subband coding and transform coding, are discussed in Tribolet and Crochiere, "Frequency Domain Coding of Speech," *IEEE Trans. on Acoust., Speech. Signal Proc.*, vol. ASSP-27, October, 1979, pp. 512–30. By using subband coding or transform coding, quantizing errors can be reduced in particular frequency bands where quantizing noise is especially objectionable by quantizing that band with a smaller step size.

Subband coding may be implemented by various types of digital bandpass filters. Transform coding may be implemented by any of several time-domain to frequency-domain transforms. Although transforms are easier to implement and require less computational power and hardware than many other types of digital filters, they have less design flexibility in the sense that each bandpass filter "frequency bin" represented by a transform coefficient has a uniform bandwidth. By contrast, a bank of digital bandpass filters can be designed to have different subband bandwidths. Transform coefficients can, however, be grouped together to define "subbands" having bandwidths which are multiples of a single transform coefficient bandwidth. The term "subband" is used hereinafter to refer to selected portions of the total signal bandwidth, whether implemented by a subband coder or a transform coder. A subband as implemented by transform coder is defined by a set of one or more adjacent transform coefficients or frequency bins. The bandwidth of a transform coder frequency bin depends upon the coder's sampling rate and the number of samples in each signal sample block (the transform length).

Tribolet and Crochiere observed that two characteristics of subband bandpass filters are particularly critical to the performance of subband coder systems because they affect the amount of signal leakage between subbands. The first is the bandwidth of the regions between the filter passband and stopbands (the transition bands). The second is the attenuation level in the stopbands. As used herein, the measure of filter "selectivity" is the steepness of the filter response curve within the transition bands (steepness of transition band rolloff), and the level of attenuation in the stopbands (depth of stopband rejection).

Filter banks implemented by discrete transforms have limited selectivity and do not produce a perfectly accurate set of frequency coefficients because they work with only a finite segment of the signal. Strictly speaking, discrete transforms produce a time-frequency representation of the input time-domain signal rather than a true frequency-domain representation which would require infinite transform lengths. For convenience of discussion, however, the output of discrete transforms will be referred to as a frequency-domain representation. In effect, the discrete transform assumes the sampled signal only has frequency components whose periods are a submultiple of the finite sample interval. This is equivalent to an assumption that the finite-length signal is periodic. The assumption in general is not true. The assumed periodicity creates discontinuities at the edges of the finite time interval which cause the transform to create phantom high-frequency components.

One technique which minimizes this effect is to reduce the discontinuity prior to the transformation by weighting the signal samples such that samples near the edges of the interval are close to zero. Samples at the center of the interval are generally passed unchanged, i.e., weighted by a factor of one. This weighting function is called an "analysis window" and may be of any shape, but certain windows contribute more favorably to filter bank performance.

While there is no single criteria which may be used to assess a window's quality, general criteria include steepness of transition band rolloff and depth of stopband rejection. In some applications, the ability to trade steeper rolloff for deeper rejection level is a useful quality. As the transform sample blocks become shorter there is more sidelobe leakage through the filter's transition band and stopband. A well shaped analysis window reduces this leakage.

What is needed is an efficient method for allocating bits to spectral components which can account for spectral leakage in digital filter banks.

SUMMARY OF THE INVENTION

In accordance with the teachings of the present invention in one embodiment, an encoder provides for the digital encoding of wideband audio information. Subband information is generated in response to the wideband audio information. Using adaptive bit allocation, the subband information is quantized to form digital words which are assembled into a digital output having a format suitable for storage or transmission. Bits are adaptively allocated to digital words representing one or two subbands adjacent to a given subband on the basis of a spectral level, such as either amplitude or power, in the given subband. Error correction codes may be used in applications where the transmitted signal is subject to noise or other corrupting effects of the communication path.

Also in accordance with the teachings of the present invention in one embodiment, a decoder provides for the high-quality reproduction of digitally encoded wideband audio signals encoded by an encoder according to the invention. The decoder receives the digital output of the encoder via a storage device or transmission path. Using adaptive bit allocation, the decoder derives quantized digital words from the formatted digital signal and reconstructs subband information therefrom. Bits are adaptively allocated to digital words representing one or two subbands adjacent to a given subband on the basis of a spectral level in the given subband. Wideband audio information is generated in response to the reconstructed subband information by means having characteristics inverse to those of the means in the encoder which generated the subband information.

In one embodiment of a transform coding system, an adaptive bit allocation technique establishes a variable bit-length mantissa for each transform coefficient, which bit length is the sum of a fixed number of bits and a variable number of bits determined by adaptive bit allocation based on whether, because of current signal content, noise in the subband is less subject to psychoacoustic masking than noise in other subbands. The fixed number of bits are assigned to each subband based on empirical observations regarding psychoacoustic-masking effects of a single-tone signal in the subband under consideration. The assignment of fixed bits takes into consideration the poorer subjective performance of the system at low frequencies due to the greater selectivity of the human auditory system at low frequencies. Although masking performance in the presence of complex signals ordinarily is better than in the presence of single tone signals, masking effects in the presence of complex signals are not as well understood nor are they as predictable. The allocation technique is not aggressive in the sense that most of the bits are fixed bits and a relatively few bits are adaptively assigned.

The empirical technique for allocating bits may be better understood by reference to FIG. 7 which shows critical band spectra of the output noise and distortion (e.g., the noise and distortion shown is with respect to auditory critical bands) resulting from a 500 Hz sine wave for three different bit allocations compared to auditory masking. The figure is intended to demonstrate an empirical approach rather than any particular data.

Allocation A (the solid line) is a reference, showing the noise and distortion products produced by the 500 Hz sine wave when some given number of bits are allocated to each of the transform coefficients. Allocation B (the short dashed line) shows the noise and distortion products for the same relative bit allocation as allocation A but with 2 fewer bits per transform coefficient. Allocation C (the long dashed line) is the same as allocation A for frequencies in the lower part of the audio band up to about 1500 Hz. Allocation C is then the same as allocation B for frequencies in the upper part of the audio band above about 1500 Hz. The dotted line shows the auditory masking curve for a 500 Hz tone.

It will be observed that audible noise is present at frequencies below the 500 Hz tone for all three cases of bit allocation due to the rapid fall off of the masking curve: the noise and distortion product curves are above the masking threshold from about 100 Hz to 300 or 400 Hz. The removal of one or more bits (allocation A to allocation B) increases the audible noise and distortion; adding back the removed bits over a portion of the spectrum including the region below the tone, as shown in allocation C, restores the original audible noise and distortion levels. Audible noise is also present at high frequencies but does not change as substantially when bits are removed and added because at that extreme portion of the audio spectrum the noise and distortion products created by the 500 Hz tone are relatively low.

By observing the noise and distortion created in response to tones at various frequencies for various bit allocations, bit lengths for the various transform coefficients can be allocated that result in acceptable levels of noise and distortion with respect to auditory masking throughout the audio spectrum. With respect to the example in FIG. 7, in order to lower the level of the noise and distortion products below the masking threshold in the region from about 100 Hz to 300 or 400 Hz, additional bits could be added to the reference allocation for the transform coefficient containing the 500 Hz tone and nearby coefficients until the noise and distortion dropped below the masking threshold. Similar steps would be taken for other tones throughout the audio spectrum until the overall transform-coefficient bit-length allocation resulted in acceptably low audible noise in the presence of tones, taken one at a time, throughout the audio spectrum. This is most easily done by way of computer simulations. The fixed bit allocation assignment is then taken as somewhat less by removing one or more bits from each transform coefficient across the spectrum (such as allocation B). Adaptively allocated bits are added to reduce the audible noise to acceptable levels in the problem regions as required (such as allocation C). Thus, empirical observations regarding the increase and decrease of audible noise with respect to bit allocation such as in the example of FIG. 7 form the basis of the fixed and adaptive bit allocation scheme.

This adaptive allocation technique represents one implementation of a particular psychoacoustic model. Other implementations of this model as well as implementations of other psychoacoustic models may be used in coding systems which incorporate aspects of the present invention. Examples of other techniques which can utilize teachings of the present invention include those disclosed in international patent application publications WO 95/02928, WO 95/02929, WO 95/02930 and WO 95/06984, all of which are incorporated by reference in their entirety.

In one embodiment of an encoder, the quantized transform coefficients are expressed by a block-floating-point representation comprising block exponents and variable-length mantissas. As described above, the variable-length mantissas further comprise a fixed-length portion and a variable-length portion of adaptively assigned bits. The encoded signal is formatted into frames comprising exponents and the fixed-length portion of the mantissas are assembled into pre-established positions within the frame. The variable-length portion of the mantissas comprising adaptively allocated bits are also assembled into the frame. By assembling the exponents and fixed-length portion of mantissas into known positions within the frame, a number of advantages may be realized including reducing vulnerability to noise burst errors, reducing processing delays in the decoder, and/or satisfying other encoding/decoding processing requirements. Other representations of transform coefficients may be used to practice the present invention including simple integer expressions and various scaled expressions comprising scaled values associated with scaling factors.

In a coding system using so called backward-adaptive bit allocation, an encoder need not transmit side information regarding the assignment of adaptively allocated bits in each frame because the decoder can deduce the correct assignment by applying the same allocation algorithm to the exponents as that used by the encoder. In a coding system using so called forward-adaptive bit allocation, an encoder does transmit side information regarding bit allocations. Embodiments of systems using backward-adaptive allocation techniques are discussed in more detail herein; however, the present invention may be practiced in embodiments of systems using forward-adaptive allocation as well.

Features of the invention and its various embodiments are set forth in greater detail in the following Detailed Description of the Invention and in the accompanying drawings.

BRIEF DESCRIPTION OF DRAWINGS AND TABLES

FIGS. 1a and 1b are functional block diagrams illustrating the basic structure of a split-band encoder and a split-band decoder, respectively.

Figure 2:
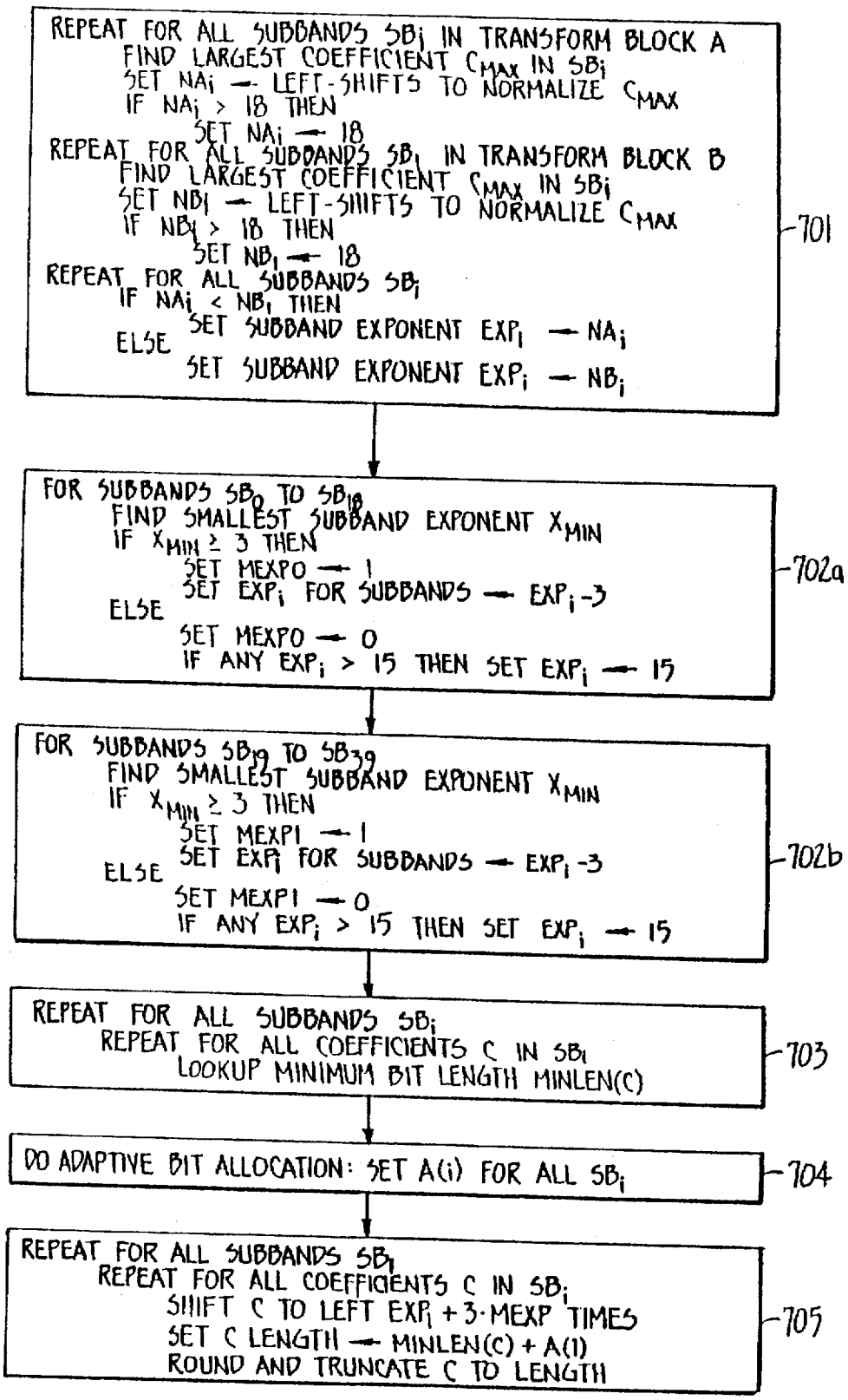
FIG. 2 is a flow chart showing the high level logic for one embodiment of a quantizer.

Table I shows master exponents, subband grouping and coefficient bit lengths for one embodiment of a transform encoder and decoder.

DETAILED DESCRIPTION OF THE INVENTION

FIGS. 1a and 1b show the basic structure of particular embodiments of a split-band encoder and split-band decoder, respectively. The split-band encoder shown in FIG. 1a comprises signal input 100, signal sampler and quantizer 101, signal sample buffer 102 which buffers signal samples into signal sample blocks, analysis-window multiplier 103 which modulates each signal block, digital filter bank 104 which transforms the quantized signal into frequency coefficients, block-floating-point encoder 105 which converts each integer-valued transform coefficient into a floating-point representation, adaptive bit allocator 106 which assigns bits to the representation of each transform coefficient according to the total signal's spectral composition, quantizer 107 which shortens each transform coefficient to an assigned bit length, and formatter 109 which assembles the coded frequency coefficients into a bit stream for transmission or storage. FIG. 1a depicts a transmission path 110, however, it should be understood that the encoded signal may be stored immediately for later use.

The split-band decoder shown in FIG. 1b comprises encoded bit-stream signal input 111, deformatter 112 which extracts each encoded frequency coefficient from the assembled bit stream, linearizer 113 which converts each encoded coefficient into an integer-valued transform coefficient, inverse digital filter bank 114 which transforms the transform coefficients into a time-domain signal block, synthesis-window multiplier 115 which modulates the time-domain signal block, signal block overlap-adder 116 which recovers a representation of the input signal, analog signal generator 117, and analog signal output 118.

A. Input Signal Sampling, Windowing and Filtering

In one embodiment of an encoder, signal sampler and quantizer 101 is an analog-to-digital converter which quantizes the input signal and forms an integer representation. All subsequent transform calculations are performed in integer arithmetic. The analog input signal should be limited in bandwidth to at most 20 kHz. This may be accomplished by a low-pass filter not shown in FIG. 1a. In another embodiment, sampler and quantizer 101 is omitted because the input signal is a digital signal comprising signal samples. A sample rate of 48 kHz is chosen for one embodiment because this rate is used in many professional applications. Other sampling rates, such as 44.1 kHz may be conveniently used in applications such as in Compact Disc systems. If an alternate rate is chosen, the frequency separation between adjacent transform coefficients will be altered and the number of coefficients required to represent the desired signal bandwidth will change. The full effect that a change in sampling rate will have upon various embodiments will be apparent to one skilled in the art.

Analysis-window multiplier 103 applies a weighting function, called an analysis window, which is a sample-by-sample multiplication of signal samples-grouped into blocks in sample buffer 102. The analysis window has been the subject of considerable study because its shape has profound affects upon digital filter performance. See, for example, Harris, "On the Use of Windows for Harmonic Analysis with the Discrete Fourier Transform," *Proc. IEEE*, vol. 66, 1978, pp. 51–83. Briefly, a good window increases the steepness of transition band rolloff and depth of stopband rejection, and permits correction of its time-domain modulation effects by subsequent overlapping and adding adjacent blocks.

In some embodiments, a discrete transform implements digital filter bank 104 shown in FIG. 1a. Filtering is performed by converting the time-domain signal sample blocks into a set of time varying spectral coefficients. Any one of several transform techniques may be used to implement the filter bank. The transform technique used in one embodiment of an encoder was first described in Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153–1161. This transform is the time-domain equivalent of an evenly-stacked critically sampled single-sideband analysis-synthesis system and is referred to herein as Evenly-Stacked Time-Domain Aliasing Cancellation (E-TDAC). An alternative form of the TDAC transform is described in Princen, Johnson, and Bradley, "Subband/Transform Coding Using Filter Bank Designs Based on Time Domain Aliasing Cancellation," *ICASSP* 1987 *Conf. Proc.*, May 1987, pp. 2161–64. This alternate transform is the time-domain equivalent of an oddly-stacked critically sampled single-sideband analysis-synthesis system and is referred to herein as Oddly-Stacked Time-Domain Aliasing Cancellation (O-TDAC). The two filter bank implementations are collectively referred to herein as TDAC filter banks or TDAC transforms. Specific ways in which these transforms may be implemented are disclosed in U.S. Pat. No. 5,297,236 and in U.S. patent application Ser. No. 08/412,377, both of which are incorporated by reference in their entirety.

E-TDAC utilizes a transform function which is equivalent to the alternate application of a modified Discrete Cosine Transform (DCT) with a modified Discrete Sine Transform (DST). O-TDAC applies a modified DCT. Additional details about these transforms may be obtained from the two Princen, et al. references cited above.

B. Quantization

Each transform coefficient derived from filter bank 104 is encoded and grouped into subbands by quantizer 108. (Table I shows the assignment of transform coefficients to subbands.) In one embodiment, the quantizer comprises block-floating-point encoder 105, adaptive bit allocator 106, and uniform quantizer 107 shown in FIG. 1a. Quantization may be performed for transform block pairs: either two adjacent blocks in a one-channel system, or one block from each channel of a two-channel system. As depicted in FIG. 2, quantization comprises five major sections: (1) calculating subband exponents, (2) determining the master exponents, (3) initially setting the bit length of each coefficient mantissa as a function of the coefficient's frequency, (4) adaptively allocating additional bits to specific mantissas, and (5) shortening and truncating the mantissa according to the bit length computed from the sum of the adaptive bit allocations and the minimum bit length based on the coefficient's frequency.

Floating-point representation of numerical quantities is well known in the art of digital data processing and is used to represent a wider range of values with fewer bits than is possible with integer representation. A floating-point number is composed of a mantissa and an exponent. In one embodiment, the mantissa is a signed integer-valued expression expressed in two's complement form.

The corresponding exponent is an unsigned value equal to the power of two of the multiplier required to convert the mantissa (either normalized or unnormalized) into the true value of the represented numerical quantity. This representation can be expressed as $$F = M \cdot 2^{-E}$$

where

F=the value of the floating-point number,
M=the signed integer-valued mantissa, and
E=unsigned integer-valued exponent.

For example, an exponent of three indicates the true value of the floating-point number is obtained by multiplying the integer-valued mantissa by $2^{-3}$. This is equivalent to shifting a binary representation of the mantissa three places to the right.

A positive nonzero mantissa is said to be normalized when its most significant data bit is nonzero. A negative-valued mantissa is normalized when its most significant data bit is zero. A normalized mantissa insures the greatest number of significant bits for the numerical quantity is contained within the mantissa's limited bit length.

Block-floating-point representation is also well known in the art and is used to represent a set of floating-point numbers with fewer bits than is possible with conventional floating-point representation. This technique uses one exponent for a block or group of mantissas. Some mantissas in the group may not be normalized. The mantissa for the quantity with the largest magnitude in the group will be normalized provided it is not too small, i.e., the exponent is incapable of expressing the multiplier required for normalization. Whether the mantissas are normalized or not, however, the exponent always represents the number of times each integer-valued mantissa in the group must be shifted to the right to obtain the true value of the floating-point quantity.

1. Subband Exponents

The block-floating-point encoder comprises sections one and two of the quantizer. The functions performed by the first section are shown in box 701 of FIG. 2. This section calculates the subband exponents for each of several subband frequency coefficients. The subbands are shown in Table I.

In one embodiment, one set of subband exponents is shared by two transform blocks. The procedures and techniques discussed below are more particularly directed toward subband exponent sharing, but it will be apparent that other embodiments are possible which do not share subband exponents.

The procedure comprises three steps. The first step finds the largest transform coefficient in each subband within one transform block and determines the number of left shifts required to normalize these largest 24-bit coefficients. The second step determines corresponding shift values for a second transform block. The third step compares the shift value for each subband in the first transform block with the corresponding subband's shift value in the second transform block, selects the smaller of the two, and saves it as the exponent for the appropriate subband in both blocks. The exponents are shared by the coefficient mantissas in each transform block.

2. Master Exponent

The second section of the quantizer determines the value of a one-bit master exponent for each of two subband groups. The master exponent is used to expand the dynamic range of the coder. Referring to Table I, it may be seen that master exponent MEXP0 represents a low frequency group of subbands. Master exponent MEXP1 represents a high frequency group of subbands. If all subband exponents in a group are three or greater, the master exponent for that group is set to one and all subband exponents in that group are reduced by three. When a master exponent is set to one, it indicates that all coefficient mantissas within all subbands in the group are shifted to the left three more times than is indicated by the subband exponent values. When a master exponent is zero, each subband exponent in the group correctly represents the total left shifts for each coefficient mantissa in the subband. These master exponents permit using shorter subband exponents while allowing for a sufficient dynamic range. This step in the process is shown in boxes 702a and 702b of FIG. 2.

An additional step can be taken which may reduce the total bits required to represent the coded signal. In all subbands where an exponent represents a single coefficient, the sign bit of a normalized mantissa is superfluous. As discussed above, the sign bit and the most significant data bit in a normalized mantissa are always of opposite value. The sign bit can therefore be dropped by the encoder and restored by the decoder. The dropped sign bit is referred to herein as a "hidden bit."

Whether a mantissa is normalized can be determined by examining the exponent. If the exponent is less than its maximum value (which is 15 after adjusting for the master exponent in the floating point scheme used in the embodiment discussed above), the mantissa is known to be normalized. If the exponent is equal to its maximum value, no conclusion can be drawn, therefore it is assumed the mantissa is not normalized and there is no hidden bit.

This technique can be used only for those mantissas which have their own unique exponent. In the embodiment discussed above in which subband exponents are shared, only DCT subband zero meets this requirement: it comprises only one transform coefficient and it does not share its exponent with a subband in the paired DST block. In embodiments which do not share exponents between pairs of transform blocks, the hidden bit technique may be used for all subbands containing only one coefficient.

The reduction in bit requirements is reflected in the fixed bit length for DCT coefficient zero. As shown in Table I, the "minimum" bit length of coefficient C(0) is 8 bits. If the hidden bit technique were not utilized, the fixed length for C(0) would be identical to that for coefficient S(0), or 9 bits.

3. Fixed-Bit Length

Figure 4:
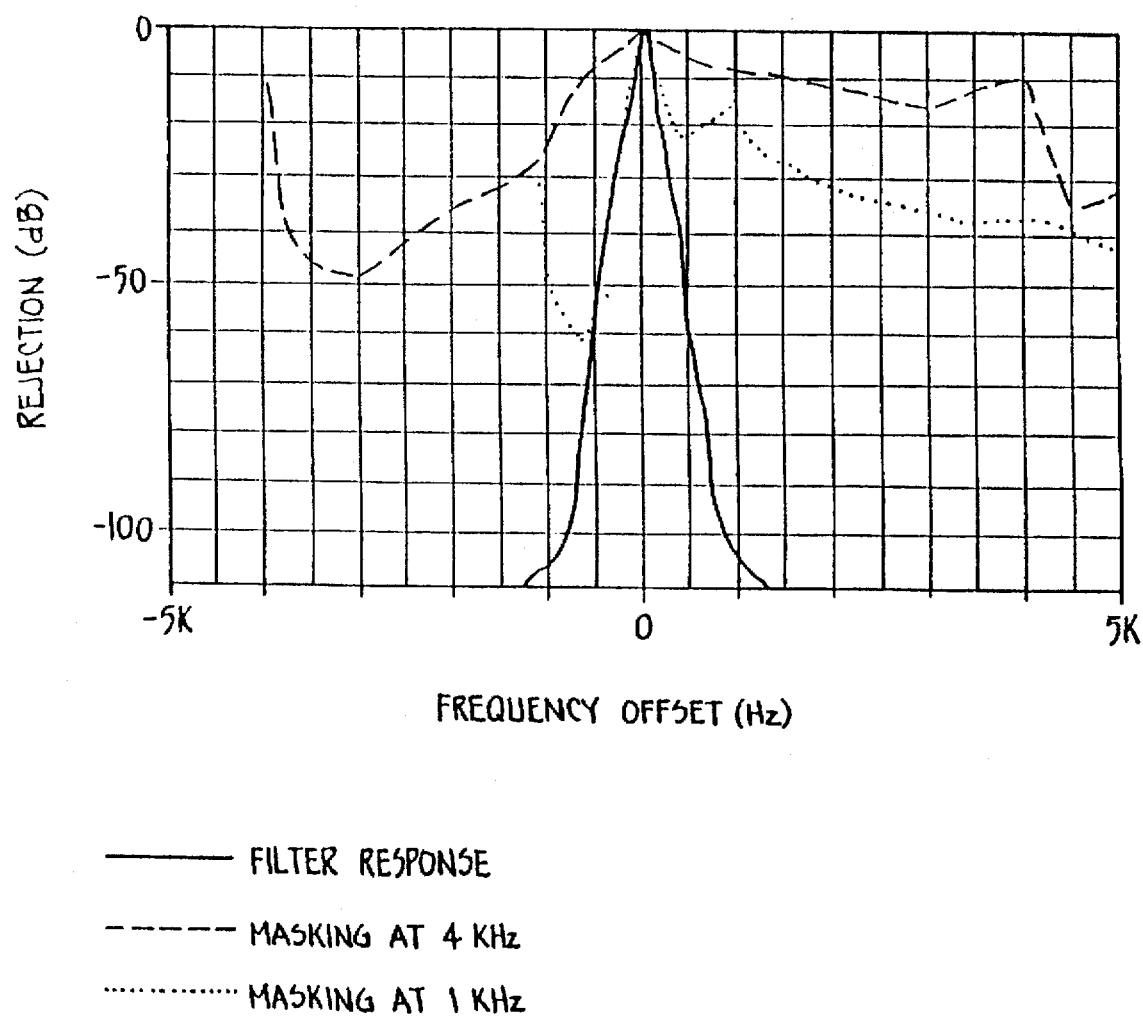
FIG. 4 is a graphical representation showing a representative filter characteristic response curve and two psychoacoustic masking curves.

The third section of the quantizer sets an initial minimum bit length for the representation of each left-shifted transform coefficient. This length is set according to the coefficient's frequency. Box 703 in FIG. 2 represents this section of the process and Table I shows the minimum number of bits fixed for each coefficient's mantissa. The minimum bit length was derived by comparing a representative filter bank response curve to a psychoacoustic masking threshold curve. Because filter performance is a function only of the difference in frequency between a signal and the coefficient's frequency, any frequency coefficient may be used to represent the filter bank's response. The response curve shown in FIG. 4 is obtained from the root mean square average of the filter's response to a range of frequencies within the filter passband. As discussed above, filter selectivity is affected by the shape of the analysis window and the number of samples in each time-domain signal block. It may be noted here that the overall coder characteristic response is not as good as that shown in FIG. 4 because an additional selectivity loss occurs during the signal synthesis process.

Two psychoacoustic masking curves are shown in FIG. 4. These curves were derived from Fielder, "Evaluation of the Audible Distortion and Noise Produced by Digital-Audio Converters," *J. Audio Eng. Soc.*, vol. 35, 1988, pp. 517–534. Auditory selectivity of the human auditory system varies greatly with frequency, however, the 1 kHz curve is representative of human auditory system characteristics for frequencies between 500 Hz and 2 kHz, and the 4 kHz curve is representative of characteristics for higher frequencies. The rate of transition band rolloff and depth of stopband rejection for a transform coder must be as great as that for the psychoacoustic masking curve to achieve the lowest bit rates. In particular, note that auditory selectivity for frequencies below a 1 kHz masking tone is very high.

Figure 5:
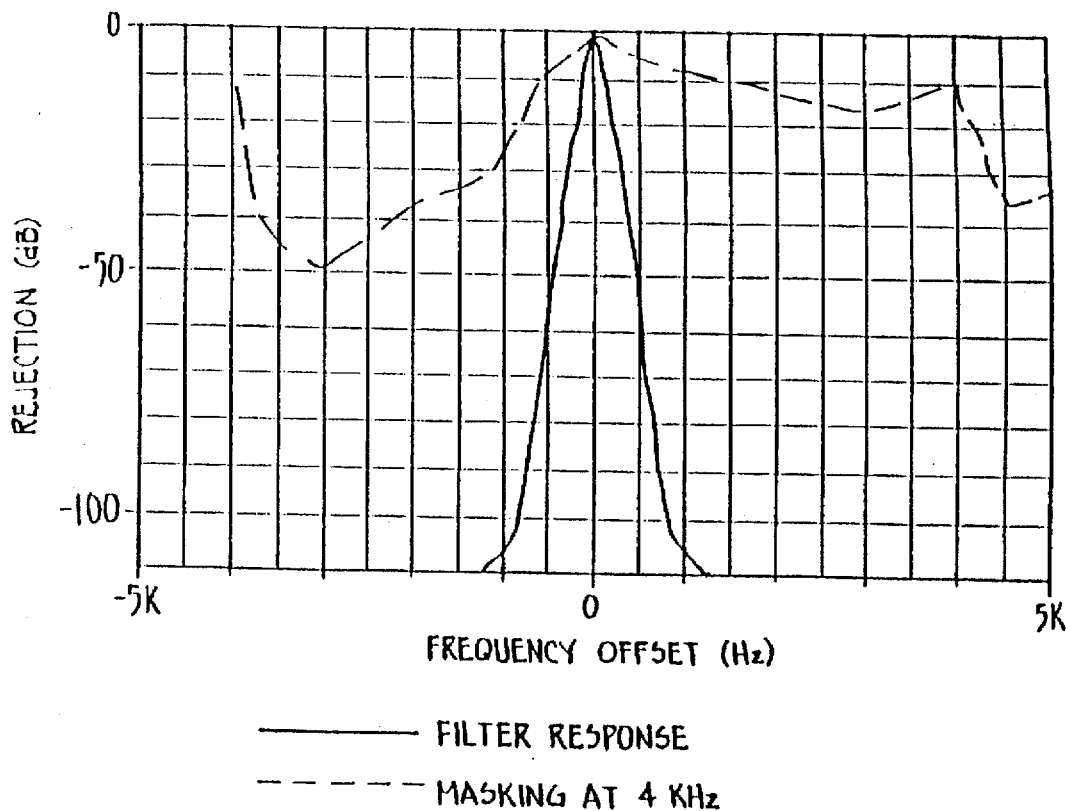
FIG. 5 is a graphical representation showing a filter characteristic response with respect to a 4 kHz psychoacoustic masking curve.

Inadequate filter selectivity is compensated in part by reserving additional bits for lower frequency coefficients. FIG. 5 compares the filter response against the 4 kHz psychoacoustic masking curve. Because coder bandwidth and selectivity improve relative to the psychoacoustic masking curve as frequency increases, fewer bits are required to represent higher frequency transform coefficients. This relationship is reflected in the minimum bit length values as shown in Table I.

Figure 6:
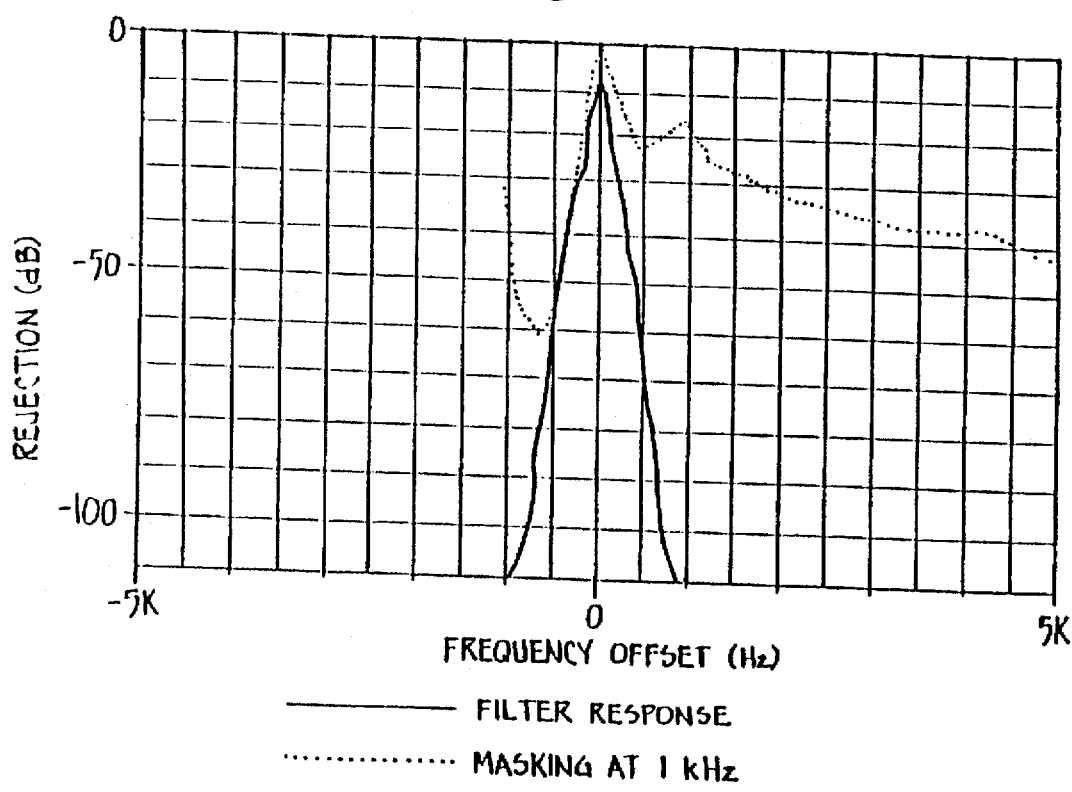
FIG. 6 is a graphical representation showing a filter characteristic response with respect to a 1 kHz psychoacoustic masking curve.
Figure 7:
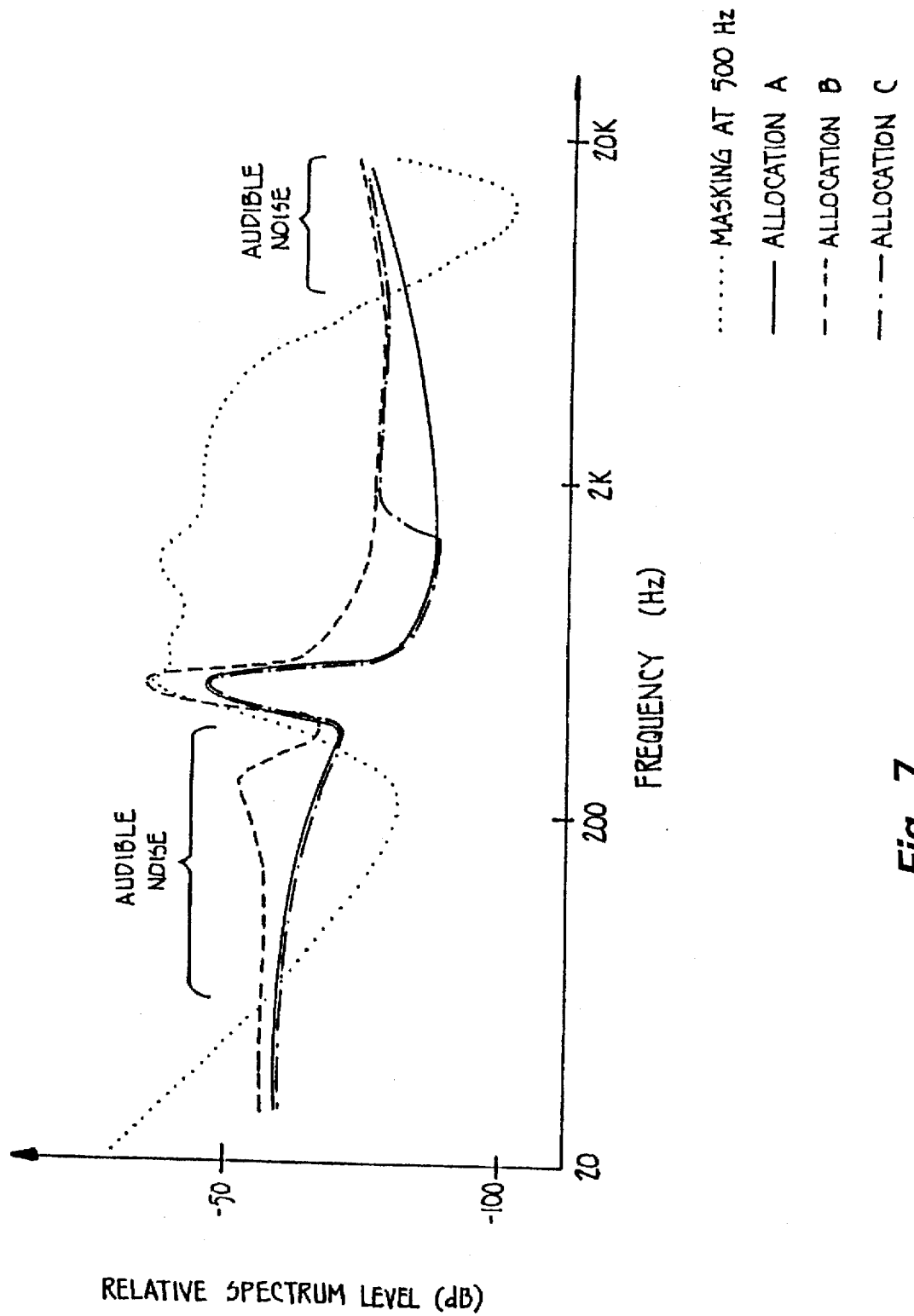
FIG. 7 is a graphical representation showing the spectral levels of coding noise and distortion of an encoded 500 Hz tone for three different bit allocation schemes with respect to the psychoacoustic masking curve for a 500 Hz tone.

FIG. 6 compares the 1 kHz masking curve against the filter response curve which is offset such that the psychoacoustic masking curve is always higher. The offset for the filter response is due to the increased accuracy afforded by additional bits reserved for the lower-frequency coefficients. Each additional bit improves the signal-to-noise ratio approximately 6 db. The graph in FIG. 6 indicates an offset of 8 db (or approximately 1.3 additional bits of accuracy) may be necessary to encode a low-frequency transform coefficient if no other tones are present to contribute to the masking effect.

The minimum lengths suggested by the masking curves shown in FIGS. 4, 5, and 6 are conservative, however, because the curves shown in these figures represent the psychoacoustic masking effect produced by a single tone or a very narrow band of noise. Music is generally a more complex signal than a few discrete frequencies, and the resulting increase in masking levels permits a reduction in the required accuracy of transform coefficients. Consequently, the minimum bit lengths for all but DCT coefficient C(0) and DST coefficient S(1) shown in Table I are obtained by deducting one or more bits from the bit length of each coefficient coefficient suggested by the masking curves in FIGS. 5 and 6. Except for these two lowest-frequency coefficients, adaptive bit allocation provides additional bits where needed for increased accuracy of specific coefficients.

If transform coefficients zero and one were included in the adaptive bit allocation process, the E-TDAC coder would generate quantization noise at a frequency equal to the sample block rate whenever an input signal channel contains low-frequency spectral components whose period is large compared to the sample block length. This noise would be created within the channel containing such low-frequency components by the interaction of two mechanisms. First, the E-TDAC transform would convert the low-frequency components into an alternating sequence of nonzero and zero values for coefficient zero (DCT C(0) and DST S(0)). Coefficient C(0) would be nonzero in the DCT transform blocks but coefficient S(0) would always be zero in the DST transform blocks. Coefficient one (DCT C(1) and DST S(1)) would be affected to a lesser extent due to the filter bank's sidelobe leakage. Second, by including the two lowest frequency coefficients in the adaptive bit allocation process, the allocation algorithm for the channel would toggle between two bit-assignment patterns, one for DCT blocks and the other for DST blocks. Because the number of adaptively assigned bits is fixed, bits assigned to coefficient C(0) in the DCT blocks would not be available for allocation to other transform coefficients as they would be in the DST blocks. (Because the value of coefficient S(0) is always zero, it would not be assigned any adaptively allocated bits.) This alternating allocation pattern would manifest itself as audible quantizing noise at a frequency equal to the sample block rate of 93.75 Hz (or 48 kHz/512).

The embodiment discussed above assigns a fixed bit length of 8 bits to DCT coefficient C(0) and 9 bits to DST coefficient S(1) (see Table I) and excludes them from adaptive bit allocation. This exclusion prevents the adaptive allocation scheme from generating the quantization noise described in the previous paragraph.

4. Adaptive Bit Allocation a. Overview

The fourth section of the quantizer performs adaptive bit allocation. Box 704 in FIG. 2 provides an overview of this allocation process. In general, for each transform block, bit allocation assigns a limited number of additional bits to specific coefficients in four phases. The number of bits may be chosen to balance signal coding quality and transmission bit rate. In one embodiment, the allocation limit is set at 110 bits per DCT transform block and 109 bits per DST transform block to achieve a total bit-rate of 128 kbits per second. In an application using error correction codes (discussed below), the limit must be reduced to maintain the same bit rate. This limit is referred to herein as the allocation maximum or as the number of allocable bits.

The current implementation assigns a maximum of 4 bits per coefficient. This maximum represents a design compromise between coding accuracy and total bit rate. It will be realized by one skilled in the art that this maximum, the total number of adaptively allocable bits, and the specific way in which bits are allocated based on spectral levels may be altered without changing the concept or basic purpose of the invention. The maximum allocatable bits per coefficient may also be adaptive. For example, the maximum may be responsive to input signal characteristics, increasing for signals having relatively few spectral components, and decreasing for signals having a relatively flat spectrum.

Phase zero is an initialization process for the remaining phases. Phase one assigns bits, up to a maximum of four per transform coefficient, to the coefficients within the same critical band of those frequency components with the greatest spectral energy. If all allocable bits are assigned during phase one, the allocation process stops. If not, phase two allocates additional bits to the transform coefficients which were allocated bits during phase one such that the total adaptively allocated bits for each coefficient is four. If all allocable bits are assigned during phase two, the allocation process stops. If any bits remain, phase three allocates bits to those coefficients which are adjacent to coefficients that were allocated bits during phase one and two. A more detailed conceptual description of this procedure is provided in the following paragraphs. The actual logic implementation of the procedure is discussed later.

Figure 3:
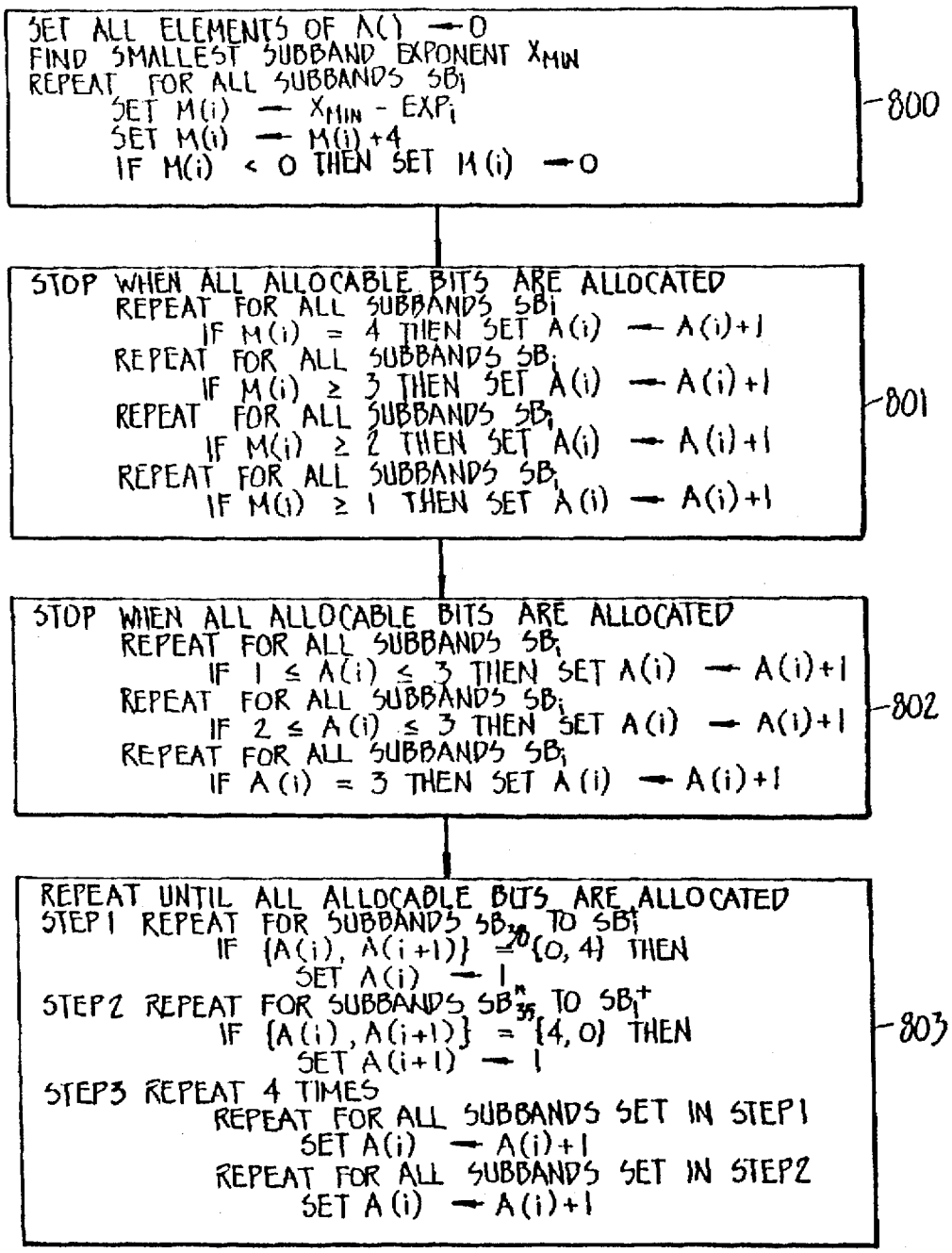
FIG. 3 is a flow chart showing more detailed logic for one embodiment of an adaptive bit allocation process.

FIG. 3 is a diagram of the conceptual process used to adaptively allocate bits to specific transform coefficients. The initialization steps of phase zero are shown in box 800. The first step initializes the elements of an array A( ) to zero. The next step identifies the smallest subband exponent, which is the exponent for the subband with the largest spectral component, and saves the value as $X_{MIN}$. All subband exponents are subtracted from $X_{MIN}$ and the difference is stored in array M( ). Note that the smallest possible subband exponent is zero and the largest possible subband exponent is eighteen, which is the sum of a maximum value of fifteen for a 4-bit high frequency subband exponent plus the value of three for the master exponent MEXP1. See Table I. Therefore, the range of possible values in array M( ) is negative eighteen to zero. In the next step, four is added to each element of array M( ) and all elements below zero are set to zero. At the end of phase zero, array M( ) consists of a set of elements, one for each subband, whose values range from zero to four. The elements with a value of four represent those subbands where at least one of the coefficients in the subband has one of the largest spectral coefficients in the total signal.

Phase one constructs another array A( ), which represents the bits to be allocated to the coefficients in each subband, using the process shown in FIG. 3 box 801. Each element in A( ) corresponds to a subband. Recall from Table I that the higher subband exponents represent multiple transform coefficients, therefore each element of A( ) represents the number of bits assigned to all transform coefficients in the corresponding subband. For example, referring to Table I, subband 13 represents coefficients 14–15. If element A(13) has a value of one, this indicates that 2 bits are allocated, one each to transform coefficients 14 and 15. Continuing the example, if element A(36) has a value of two, then 30 bits are allocated, 2 bits each to coefficients 163–177. During the allocation process, as each element of A( ) is incremented, the number of allocated bits is deducted from the number of bits remaining for allocation.

When all of the allocable bits are assigned during this or any following phase, that phase immediately terminates and all of the subsequent phases are skipped. During the final step in which the allocation limit is reached, the number of bits assigned to a subband during that step will not exceed the number of bits remaining for allocation. If the last of the allocable bits are assigned while processing a subband with more than one coefficient, it is likely that not all of the coefficients in that subband will be allocated the same number of bits.

Starting with the M( ) array element representing the lowest-frequency coefficient (M(1) for DCT blocks, or element M(2) for DST blocks), each element of M( ) is examined in turn. As many as four passes are made through array M( ), or until all allocable bits are allocated. On the first pass, each element in array A( ) is incremented by one if the corresponding element in array M( ) has a value equal to four. The second pass increments by one each element in A( ) which corresponds to each element in M( ) which has a value equal to three or four. On the third pass, array A( ) elements are incremented if the corresponding M( ) element has a value within the range of two to four. The final pass increments those elements in array A( ) corresponding to those M( ) elements which have a value in the range between one and four. It may be noted that if the elements in array M( ) sum to the allocation limit or less, the contents of arrays M( ) and A( ) at this point will be identical. If the number of bits assigned has reached the allocation limit, the bit-allocation process is complete at the end of phase one.

If any allocable bits remain, allocation continues with phase two shown in box 802 of FIG. 3. This phase makes as many as three passes through array A( ), stopping earlier if and when the maximum allocable bits are assigned. Each pass starts with the lowest frequency element (A(1) for DCT blocks, or A(2) for DST blocks) and works upward in frequency. On the first pass through array A( ), each element which has a value between one and three is incremented by one. On the second pass, elements with values of two or three are incremented. On the third pass, elements equal to three are incremented. If this phase completes without exceeding the allocation limit, every element in array A( ) will have a value of either four or zero.

If any allocable bits remain, allocation continues with phase three shown in box 803 of FIG. 3. Like the previous phases, phase three allocation will terminate as soon as the allocation limit has been reached. This final phase assigns additional bits to transform coefficients with lower spectral energy which are adjacent to subbands of coefficients with higher energy. This assignment is accomplished in three steps. The first step scans array A( ) starting with the highest frequency element A(39) in search of a group of two adjacent elements which have the values {0,4}. If found, the element whose value is zero is set to one such that the group values become {1,4}.

If the allocation limit has not been reached, step two of phase three begins by scanning array A( ) downward starting with the highest frequency subband in search of a group of two adjacent elements which have the values {4,0}. If found, the zero-valued element is set to one to produce values {4,1}.

The third and final step of phase three allocates additional bits to the coefficients in subbands assigned bits in steps one and two of this phase. Starting at the highest frequency element of array A( ), each element modified in step one is incremented. Finally, elements modified in step two are incremented, starting with the highest frequency subbands. This third step reiteratively increments the array elements in the same order discussed above until all allocable bits are assigned, or until all of the elements modified in steps one and two are assigned a total of 4 bits each. If the latter condition is met and any allocable bits remain to be assigned, phase three repeats starting with step one.

b. Adaptive Bit Allocation Logic

The concept of the adaptive bit allocation algorithm is represented in FIG. 3 and described above. An understanding of the algorithm's concept is helpful in gaining an understanding of the actual logic of the adaptive bit allocation routine.

Phase zero begins by initializing all elements of array A( ) equal to zero, and constructing four tables $T_1$ through $T_4$. The construction of the tables is accomplished through the following steps: (1) identify the smallest subband exponent and save this value as $X_{MIN}$; (2) starting with the lowest frequency subband (subband 1 for DCT blocks, or subband 2 for DST blocks), subtract the subband exponent (see Table I) from $X_{MIN}$; (3) if the difference is zero, insert the subband number into tables $T_1$, $T_2$, $T_3$, and $T_4$; (4) if the difference is negative one, insert the subband number into tables $T_1$, $T_2$, and $T_3$; (5) if the difference is negative two, insert the subband number into tables $T_1$, and $T_2$; (6) if the difference is negative three, insert the subband number into table $T_1$; (7) continue steps three through six for each subband until all subbands have been processed. At the end of this step, table $T_1$ contains the numbers of all subbands that have exponents in the range $X_{MIN}-3$ to $X_{MIN}$, table $T_2$ contains subbands with exponents from $X_{MIN}-2$ to $X_{MIN}$, table $T_3$ contains subbands with exponents from $X_{MIN}-1$ to $X_{MIN}$, and table $T_4$ contains subbands with exponents equal to $X_{MIN}$. Of significance, subband entries in each table are in ascending order according to frequency.

Phase one allocates bits to transform coefficients in subbands with the largest subband exponents. Starting with the first (lowest frequency) entry in table $T_4$, one bit is allocated to each transform coefficient within each subband represented in the table. The allocation is repeated in turn for table $T_3$, $T_2$, and finally table $T_1$. This process continues until all allocable bits have been assigned or until all entries in tables $T_4$ to $T_1$ have been processed. As a bit is assigned to all coefficients in a subband, an entry in array A( ) corresponding to that subband is incremented by one such that the elements in A( ) reflect the total bits allocated to each transform coefficient in each subband.

As noted earlier, allocation terminates immediately when all of the allocable bits are assigned. Each table entry represents a subband which, in general, contains multiple transform coefficients. Therefore, if the last of the allocable bits are assigned to a table entry representing a subband with more than one coefficient, it is probable that not all of the coefficients in that subband can be allocated the same number of bits. In such situations, the allocation process notes which coefficients in the subband must have a bit deducted from the subband's allocation amount subsequently stored in array A( ).

Phase two constructs four new tables, $T_1$ through $T_4$, using a procedure similar to that used in phase zero: (1) $X_{MIN}$ still retains the smallest subband exponent; (2) for the lowest frequency subband (subband 1 for DCT blocks, or subband 2 for DST blocks), subtract the subband exponent from $X_{MIN}$; (3) if the difference is zero, insert the subband number into table $T_4$; (4) if the difference is negative one, insert the subband number into table $T_3$; (5) if the difference is negative two, insert the subband number into table $T_2$; (6) if the difference is negative three, insert the subband number into table $T_1$; (7) continue steps three through six for each subband until all subbands have been processed. At the end of this step, table $T_1$ contains the numbers of all subbands that have exponents equal to $X_{MIN}-3$, table $T_2$ contains subbands with exponents equal to $X_{MIN}-2$, table $T_3$ contains subbands with exponents equal $X_{MIN}-1$, and table $T_4$ contains subbands with exponents equal to $X_{MIN}$. The entries in all of the tables are in ascending order according to the frequency of the transform coefficient.

Phase two assigns bits to all coefficients represented by subbands in tables $T_3$ to $T_1$ until each coefficient has received a total of four additional bits, or until the allocation limit has been reached. Starting with the first (lowest frequency) entry in table $T_3$, one bit is assigned to each coefficient contained within each subband represented in the table. As each subband is processed, the entry is removed from table $T_3$ and inserted into table $T_4$. Next, coefficients associated with entries in table $T_2$ are allocated an additional bit, moving each entry from table $T_2$ to $T_3$ as the additional bit is assigned. Then entries in table $T_1$ are processed, moving the entries from table $T_1$ to $T_2$. If any allocable bits remain, allocation continues by repeating the process for table $T_3$, and then table $T_2$. If bits remain to assign, a final pass is made through the entries in table $T_3$. If phase two does not assign all remaining allocable bits, table $T_4$ contains all of the coefficients, each having received 4 bits, and tables $T_3$ through $T_1$ are empty. If all allocable bits have been assigned, array A( ) is rebuilt from the information contained in tables $T_1$ through $T_4$ to reflect the total bits allocated to each transform coefficient. Each element in array A( ) corresponding to an entry in table $T_4$ is assigned a value of four. Each A( ) element corresponding to an entry in table $T_3$ is assigned a value of three; for table $T_2$ a value of two; and for table $T_1$ a value of one. All other elements of A( ), i.e., those subbands which are not represented by entries in tables $T_1$ through $T_4$, are zero.

If any allocable bits remain, allocation continues with phase three. Table $T_4$ is sorted, ordering the subband numbers into descending frequency. The first step adds subbands to table $T_1$ which are not in table $T_4$ that are lower in frequency and adjacent to subbands which are in table $T_4$. Starting with the first (highest frequency) entry in table $T_4$, adjacent entries in the table are examined to determine if they are separated by one or more subbands. If they are, the number of the subband immediately below the higher subband is inserted into table $T_1$. For example, suppose two adjacent entries in table $T_4$ represent subbands 16 and 12. These two subbands are separated by three subbands. Therefore the number 15, representing the subband below subband 16, would be inserted into table $T_1$.

The second step adds subbands to table $T_1$ which are not in table $T_4$ that are higher in frequency and adjacent to subbands which are in table $T_4$. Starting with the first (highest frequency) entry in table $T_4$, adjacent entries in the table are examined to determine if they are separated by one or more subbands. If they are, the number of the subband immediately above the lower subband is inserted into table $T_1$. For example, suppose two adjacent entries in table $T_4$ represent subbands 16 and 12. As discussed above, these two subbands are separated by 3 subbands. Therefore the number 13, representing the subband above subband 12, would be inserted into table $T_1$.

Starting with the first entry in table $T_1$, an additional bit is assigned to each transform coefficient associated with each subband represented by an entry in table $T_1$. As each subband entry is processed, it is moved from table $T_1$ into table $T_2$. If any allocable bits remain at the end of processing table $T_1$, a similar process repeats for the entries in table $T_2$, moving each entry from table $T_2$ into table $T_3$. Processing continues with table $T_3$ entries if any bits remain to allocate, moving entries from table $T_3$ into table $T_4$. If any bits remain after this step, phase three repeats from the beginning, first determining if the entries in table $T_4$ are still sorted and if not, sorting table $T_4$ entries into descending frequency order. When all allocable bits have been assigned, array A( ) is built from the four tables as described above for phase two.

After all bits have been allocated, each transform coefficient mantissa is shortened to a bit length equal to the value of the element of array A( ) representing the subband in which the coefficient is grouped. Some coefficients in one subband, however, may have one bit deducted from their length as required to keep the total number of allocated bits equal to the allocation maximum.

c. Alternative Embodiment of Adaptive Bit Allocation

An alternative adaptive bit allocation technique entails several modifications to the allocation technique discussed above. First, all bit allocation decisions are based upon the value of "modified subband exponents" obtained by dividing each subband exponent by two and rounding down. This modification increases the bit allocation to lower amplitude spectral components by allocating an additional bit for each 12 dB increase in amplitude rather than for a 6 dB increase.

Second, in a new step zero of Phase zero, the modified exponents for all low-frequency subbands having coefficients representing frequencies below a given frequency, say 1 kHz, are examined to determine whether any is not greater than the smallest modified subband exponent plus some prescribed value. If any modified subband exponent is not greater, then all coefficients within all the low-frequency subbands are allocated one bit. For example, one bit is allocated to all coefficients in the low-frequency subbands if at least one modified subband exponent in those subbands is less than or equal to $|X_{MIN}/2|+3$. The notation $|x|$ indicates truncation or rounding down to an integer.

In one embodiment, two bits are allocated in step zero to all coefficients in the low-frequency subbands if any modified subband exponent in those subbands is less than or equal to $|X_{MIN}/2|+4$.

The allocation in new step zero of Phase zero permits more than the maximum allocatable bits per coefficient (4 in the embodiment discussed above) to be allocated to low-frequency subharmonic spectral components. It should be understood that the number of allocatable bits is reduced for each bit assigned in this step.

Third, in Phase two prior to the processing discussed above, array A( ) is scanned for all subbands having coefficients representing frequencies below a given frequency, say 4 kHz, looking for pairs of elements which have the value {0,x}, where x is any non-zero value. If so, one bit is allocated to all coefficients in the respective subband associated with the zero-valued element. This modification increases allocation to small spectral components on the low-frequency side of larger spectral components.

Fourth, Phase three scans for subbands having been allocated no bits which are adjacent to subbands which have been allocated some bits. In step one, array A( ) is scanned looking for pairs of elements which have the value {0,x}. The scan is repeated in step two, looking for pairs of elements which have the value {x,0}. Step three reiterates steps one and two; however, the allocation in step three does not increment the allocations made in steps one and two. Rather, the scans in steps one and two reiteratively look for zero values which are adjacent to non-zero values. This modification pushes bit allocation into a wider interval of subbands adjacent to larger spectral components.

Fifth, in embodiments sharing subband exponents between a DCT block and a DST block, a new Phase four uses the bit allocation for a DCT block as a starting point for determining the bit allocation for the paired DST block. Unless the DCT block allocation process stopped after allocating a number of bits exactly equal to the number of allocatable bits, the bits remaining to be allocated is negative. That is, the allocation for one or more coefficients must be reduced to keep the total number of bits allocated equal to the allocation maximum.

Because DST coefficient S(0) need not be transmitted or stored, each DST block has an additional two bits for allocation. If hidden bit processing is not used, the DST block has three additional bits. These extra bits are added to the number of bits remaining to be allocated. If the resultant sum is zero or less, DST allocation is complete.

If the resultant sum is greater than zero, the remaining bits are preferably allocated to one or more low-frequency subbands which have not yet been allocated any bits.

5. Coefficient Truncation

The fifth section of the quantizer, shown in box 705 of FIG. 2, follows the adaptive bit allocation routine. Using the subband and master exponents determined in previous sections, each transform coefficient in a transform block is shifted to the left a number of times equal to the value of the exponent for the subband in which the coefficient is grouped, plus three more shifts if the associated master exponent is set to one. Each coefficient's total bit length is then calculated by adding its minimum bit length (see Table I) to the number of adaptively allocated bits assigned to coefficients in each subband, found in array A( ). Each transform coefficient mantissa is shortened to this bit length.

As described above, each element of array A( ) represents the number of bits assigned to all coefficients within a subband. Some coefficients in one subband may have one bit deducted from their length as required to keep the total number of bits allocated to the transform block equal to the allocation maximum.

C. Formatting and Transmission or Storage

The formatting process prepares encoded transform blocks for transmission or storage. This process is represented by box 109 in FIG. 1a. The following description discusses the formatting of two adjacent transform blocks in a one-channel system represented in block-floating-point form in which subband exponents are shared. The same technique may be used to format one transform block from each channel of a comparable two-channel system in which subband exponents are shared. The techniques discussed below may be applied in other implementations such as, for example, formatting one block into a frame, formatting more than two blocks into a frame, formatting two or more blocks into a frame without exponent sharing, and/or formatting one or more blocks into a frame using a representation other than block-floating-point. More particularly, the formatting technique discussed below may apply to many forms of information comprising scale factors and scaled values and/or information comprising portions which are represented by an invariant number of bits and a variable number of bits.

A fixed length representation of each transform coefficient mantissa is formed by truncating the shortened mantissa to a length equal to the minimum bit length shown in Table I. Any additional bits allocated to the mantissa are formatted separately in an adaptive bit block. The master exponents, subband exponents, truncated coefficient mantissas, and adaptive bit blocks are then assembled according to the grouping shown in FIG. 8. Note that one set of master and subband exponents applies to both transform blocks in the block pair. (See the discussion of the nonuniform quantizer above.) By sharing exponents between each pair of blocks, the total number of bits required to represent the exponents for both transform blocks is reduced by 50%.

Figure 8:
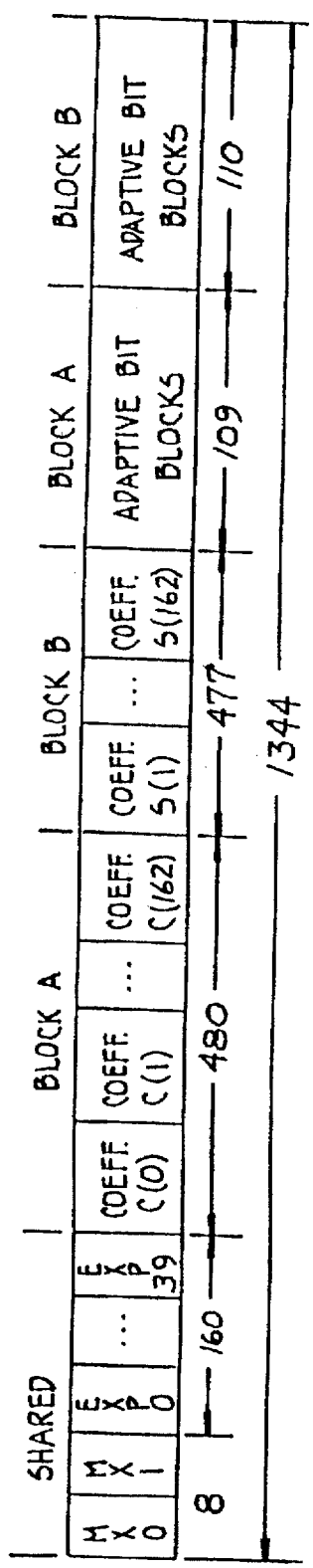
FIG. 8 is a schematic representation illustrating the format of a frame of two encoded transform blocks without error correction.
Figure 9:
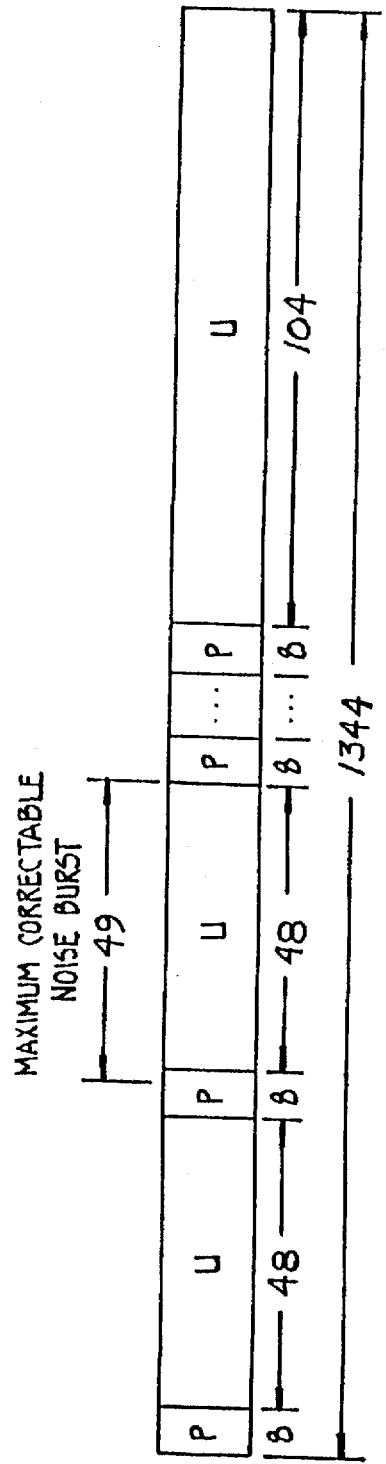
FIG. 9 is a schematic representation illustrating the format of a frame of two encoded transform blocks with error correction codes.

The formatted frame of transform blocks in FIG. 8 depicts a structure where transform block A is a DCT block and block B is a DST block. If the frame will be subject to bit errors such as those caused by noise during transmission, error correction codes are intermixed with the data as shown in FIG. 9. Additional overhead bits may be required, such as frame synchronization bits if the digital signal is intended for transmission, or database pointers or record keys if the frames are intended for storage. If frame synchronization bits are required, the formatted frame is randomized using a technique described in Smith, *Digital Transmission Systems*, New York, N.Y.: Van Nostrand Reinhold Co., 1985, pp. 228–236. Randomization is performed to reduce the probability that valid data within the frame will be mistaken for the synchronization pattern. The randomized frame is then appended to the frame synchronization bits.

Note that each transform coefficient mantissa may be represented in as many as two distinct parts or segments. The first part is composed of a fixed number of bits and is formed by truncating the shortened mantissa to a length equal to the minimum bit length shown in Table I. The second part of the representation, if present, is of varying length and is composed of the adaptively allocated bits. This two-part representation scheme may be preferred over one which represents each coefficient mantissa as a variable length word because it is more immune to corruption by noise. If a noise burst occurs in a frame utilizing a two-part form, the effects of the noise will be confined to the value of the exponents, mantissas or allocated bits directly affected by the noise. If a noise burst occurs in a frame utilizing variable length mantissas, the effects of the noise can be propagated through the remainder of the frame. This propagation may occur because the noise burst will alter not only the value of the exponents and mantissas hit directly by the noise, but also the information needed to determine the length of each variable length mantissa. If the length of one mantissa is in error, the remainder of the frame will be misinterpreted.

An encoded DCT transform block includes 223 coefficient mantissas comprising 480 bits (see Table I) and 109 adaptively allocated bits, for a total of 589 bits. DST coefficient S(0) is always zero (see Table I), therefore it need not be transmitted or stored. By using 110 adaptively allocated bits, the DST block mantissas and allocated bits comprise 587 bits. Eight bits for the two master exponent bits plus three copies of each, and 160 bits for the 40 subband exponents brings the DCT/DST block pair length to 1344 bits.

In applications where potential data corruption is of concern, an error correction scheme is necessary. Errors in subband exponents, and to the lesser extent, errors in the lower-frequency coefficient code words generally produce the greatest audible distortion. This information is the most critical data to protect. A preferred scheme protects the master and subband exponents with error detection and correction codes, and separates these values as much as possible to improve their immunity to noise burst errors. Such a scheme is shown in FIG. 9.

It will be obvious to one skilled in the art that other frame formats and correction codes may be utilized.

When error correction codes are employed, fewer adaptively allocated bits are used in order to maintain the same total bit rate. The total number of exponent and mantissa bits for one frame of a DCT/DST block pair is 1344 bits. Of this length, 168 bits are subband and master exponents. One (23,21) Reed-Solomon error correction code is added to the bit stream. The code, sixteen bits in length, provides single-symbol error detection/correction for as many as twenty-one 8-bit symbols (bytes), or 168 bits. See, for example, Peterson and Weldon, *Error-Correcting Codes*, Cambridge, Mass.: The M.I.T. Press, 1986, pp. 269–309, 361–362. These error correction code bits are added to the formatted data stream without increasing the overall data rate by reducing the number of bits available for adaptive bit allocation. As a result, the total allocable bits for each block in the transform block pair is reduced by eight bits.

The Reed-Solomon codes process data in bytes, therefore the error codes, protected data, and unprotected data are grouped into 8-bit bytes for ease of processing. The ratio of protected data to unprotected data in each block-pair frame is approximately one-to-six. This permits scattering protected data throughout the formatted frame, each 8-bit byte of protected data separated by six bytes of unprotected data. See FIG. 9. With this technique, a single burst error of as many as 49 bits may occur anywhere in the frame without corrupting more than one protected data byte. Therefore, protected data can be recovered from any single noise burst no longer than 49 bits in length.

Subject to the constraints discussed above, exponents and transform coefficient code words are assembled in ascending frequency order, and are followed by the adaptive bit blocks.

FIG. 1a illustrates transmission means 110. Transmission media include public dissemination such as broadcasting, internal use such as studio monitoring or signal mixing, and interfacility or telephonic use via terrestrial or satellite links. Storage media include magnetic tape and magnetic or optical disks.

D. Decoding

A deformatting process takes place when the digitized and coded signal is received from transmission means 111 either by receipt of a transmitted signal or retrieved from storage. The process is represented by box 112 in FIG. 1b and generally reverses the effects of the formatting process performed in the encoder.

In embodiments using backward-adaptive allocation techniques, the adaptive bit allocation routine discussed above is used to process the exponents extracted from the received signal, and the results of this process are used to determine the proper allocation of the adaptive bit blocks to the transform coefficients. In embodiments using forward-adaptive techniques, the proper allocation is derived directly from the coded signal. The portion of each transform coefficient whose length equals the minimum bit length plus any adaptively allocated bits are loaded into a word and then shifted to the right a number of times equal to the value of the appropriate subband exponent plus three additional shifts if the associated master exponent is set to one. This process is represented by box 113 in FIG. 1b.

Box 114 in FIG. 1b represents a bank of synthesis filters which transform each set of frequency-domain coefficients recovered from the deformatting and linearization procedures into a block of time-domain signal samples. An inverse transform from that used in analysis filter bank 104 in FIG. 1a implements synthesis filter bank 114. In some embodiments, a synthesis window is applied to the output of filter bank 114. Some filter bank implementations such as the TDAC transforms require use of a synthesis window. Synthesis-window modulation is represented by box 115 in FIG. 1b. Although synthesis (and analysis) window design are important to overall coding system performance, no particular window design is critical to the practice of the present invention. Various design considerations and techniques are discussed in more detail in U.S. Pat. No. 5,109,417, which is incorporated by reference in its entirety.

Box 117 in FIG. 1b represents a conventional digital-to-analog converter which generates a varying voltage analog signal in response to a digital input. The analog output should be filtered by a low-pass filter to remove spurious high-frequency components. This filter is not shown in FIG. 1b. In other embodiments of coding systems, the output signal is a digital signal and the components represented by box 117 are not required.

E. Alternative Transform

Another embodiment of a split-band encoder and decoder employs an alternate transform referred to herein as O-TDAC. The nonuniform quantizer for one O-TDAC implementation is identical to that used with one E-TDAC transform version discussed above with only a few minor differences due to the fact only DCT blocks are present. In each block pair, both transform blocks include coefficient C(0), therefore, all subband exponents are shared by the two blocks. There can be no hidden bit and the "minimum" bit length for coefficient C(0) is fixed at nine bits (as opposed to eight bits for E-TDAC). Dynamic bit allocation is virtually the same as that for E-TDAC. Coefficient C(0) is excluded from the allocation process for both blocks in each pair, and because of the increased length of each transform block pair, the allocation limit is only 108 bits.

Figure 10:
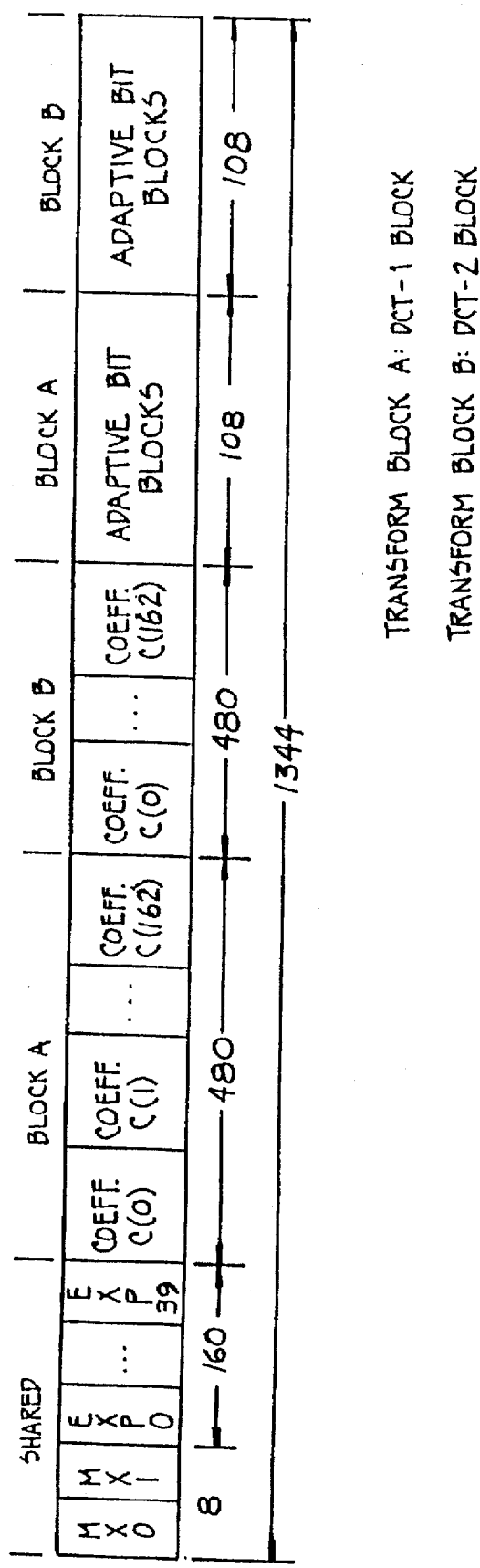
FIG. 10 is a schematic representation illustrating the format of a frame of two encoded transform blocks, without error correction, for an alternative embodiment.

Each encoded DCT block includes 223 coefficient mantissas comprising 480 bits and 108 adaptively allocated bits, for a total of 588 bits each. Eight bits for the two master exponents plus three copies of each, and 160 bits for the 40 subband exponents which are shared by both DCT blocks brings the $DCT_1/DCT_2$ may block pair length to 1344 bits, the same as that for one of the E-TDAC embodiments discussed above. The structure of the formatted frame without error correction codes is very similar to that used in the E-TDAC implementation and is shown in FIG. 10. The frame structure with error correction codes is identical to that for E-TDAC, and is shown in FIG. 9.

The deformatting process is identical to that described above except no checks are made for any hidden bits.

TABLE I

Frequency Coefficients for 20 kHz E-TDAC Coder

| Master Exp | /Subband Exp | Coefficient Exp Ln | Coefficient Numbers | Minimum Bit Ln |
|---|---|---|---|---|
| MEXP0 | EXP0 | 4 bits | 0 | 8 bits* |
| | EXP1 | | 1 | 3 bits+ |
| | EXP2 | | 2 | |
| | EXP3 | | 3 | |
| | EXP4 | | 4 | |
| | EXP5 | | 5 | |
| | EXP6 | | 6 | |
| | EXP7 | | 7 | |
| | EXP8 | | 8 | |
| | EXP9 | | 9 | |
| | EXP10 | | 10 | |
| | EXP11 | | 11 | |
| | EXP12 | | 12–13 | |
| | EXP13 | | 14–15 | |
| | EXP14 | | 16–17 | |
| | EXP15 | | 18–19 | |
| | EXP16 | | 20–21 | |
| MEXP1 | EXP17 | | 22–24 | |
| | EXP18 | | 25–27 | |
| | EXP19 | | 28–31 | |
| | EXP20 | | 32–35 | |
| | EXP21 | | 36–39 | |
| | EXP22 | | 40–43 | |
| | EXP23 | | 44–47 | |
| | EXP24 | | 48–51 | |
| | EXP25 | | 52–57 | |
| | EXP26 | | 58–67 | |
| | EXP27 | | 68–77 | |
| | EXP28 | | 78–87 | |
| | EXP29 | | 88–97 | |
| | EXP30 | | 98–107 | |
| | EXP31 | | 108–117 | |
| | EXP32 | | 118–127 | |
| | EXP33 | | 128–137 | |
| | EXP34 | | 138–147 | |
| | EXP35 | | 148–162 | 2 bits |
| | EXP36 | | 163–177 | 0 bits |
| | EXP37 | | 178–192 | |
| | EXP38 | | 193–207 | |
| | EXP39 | | 208–222 | |

*The DST always produces a zero value for coefficient S(0). This is known a priori by the decoder, therefore the exponent and mantissa for S(0) need not be transmitted or stored.
+The length for DST coefficient S(1) is 9 bits. The length for DCT coefficient C(1) is 3 bits.

I claim:

1. An encoder for the high-quality digital encoding of wideband audio information, comprising subband means for receiving said wideband audio information and for generating subband information for a plurality of subbands in response thereto, quantizing means for forming digital words by adaptively allocating bits to and quantizing said subband information, wherein bits are adaptively allocated to digital words representing a respective subband and one or two adjacent subbands on the basis of a spectral level in said respective subband, and formatting means for assembling digital information including said digital words into a coded signal having a format suitable for transmission or storage.

2. An encoder according to claim 1 wherein said subband means comprises means for forming time-domain signal sample blocks in response to said wideband audio information and means for generating analysis-window weighted time-domain signal sample blocks by weighting each of said time-domain signal sample blocks with an analysis window, and wherein said subband information comprises blocks of frequency-domain transform coefficients grouped into subbands, said transform coefficients generated by applying a discrete transform to said analysis-window weighted time-domain signal sample blocks.

3. An encoder according to claim 2 wherein said quantizing means further comprises means for estimating relative spectral level of said subband information in each subband of said plurality of subbands, means for allocating at most a maximum number of bits to digital words representing a first group of subbands possessing the greatest relative spectral levels and stopping when a certain number of bits has been allocated to each of the digital words representing said first group of subbands, and means for allocating bits to digital words representing subbands adjacent to subbands in which each of the digital words have been allocated said certain number of bits.

4. An encoder according to claim 3 wherein said certain number of bits is equal to said maximum number of bits.

5. An encoder according to claim 1 wherein said quantizing means further comprises means for estimating relative spectral level of said subband information in each subband of said plurality of subbands, means for allocating at most a maximum number of bits to digital words representing a first group of subbands possessing the greatest relative spectral levels and stopping when a certain number of bits has been allocated to each of the digital words representing said first group of subbands, and means for allocating bits to digital words representing subbands adjacent to subbands in which each of the digital words have been allocated said certain number of bits.

6. An encoder according to claim 5 wherein said certain number of bits is equal to said maximum number of bits.

7. A decoder for the high-quality reproduction of wideband audio information from a coded signal comprising digital words representing subband information for a plurality of subbands of said wideband audio information, said decoder comprising deformatting means for receiving said coded signal and for deriving said digital words therefrom, linearization means for generating said subband information by adaptively allocating bits to and dequantizing said digital words, wherein bits are adaptively allocated to digital words representing a respective subband and one or two adjacent subbands on the basis of a spectral level in said respective subband, and inverse subband means for generating a representation of said wideband audio information in response to said subband information.

8. A decoder according to claim 7 wherein said inverse subband means generates said representation of wideband audio information by applying an inverse discrete transform to said subband information.

9. A decoder according to claim 7 wherein said inverse subband means comprises means for generating time-domain signal sample blocks by applying an inverse discrete transform to said subband information, means for weighting said time-domain signal sample blocks by a synthesis window, and means for cancelling window weighting effects to generate said representation of wideband audio information.

10. A decoder according to claim 9 wherein said linearization means comprises means for estimating relative spectral level of said subband information in each subband of said plurality of subbands, means for allocating at most a maximum number of bits to digital words representing a first group of subbands possessing the greatest relative spectral levels and stopping when a certain number of bits has been allocated to each of the digital words representing said first group of subbands, and means for allocating bits to digital words representing subbands adjacent to subbands in which each of the digital words has been allocated said certain number of bits.

11. A decoder according to claim 10 wherein said certain number of bits is equal to said maximum number of bits.

12. A decoder according to claim 8 wherein said linearization means comprises means for estimating relative spectral level of said subband information in each subband of said plurality of subbands, means for allocating at most a maximum number of bits to digital words representing a first group of subbands possessing the greatest relative spectral levels and stopping when a certain number of bits has been allocated to each of the digital words representing said first group of subbands, and means for allocating bits to digital words representing subbands adjacent to subbands in which each of the digital words has been allocated said certain number of bits.

13. A decoder according to claim 12 wherein said certain number of bits is equal to said maximum number of bits.

14. A decoder according to claim 7 wherein said linearization means comprises means for estimating relative spectral level of said subband information in each subband of said plurality of subbands, means for allocating at most a maximum number of bits to digital words representing a first group of subbands possessing the greatest relative spectral levels and stopping when a certain number of bits has been allocated to each of the digital words representing said first group of subbands, and means for allocating bits to digital words representing subbands adjacent to subbands in which each of the digital words has been allocated said certain number of bits.

15. A decoder according to claim 14 wherein said certain number of bits is equal to said maximum number of bits.

16. A system for the high quality processing of wideband audio information including an encoder and a decoder, said encoder comprising subband means for receiving said wideband audio information and for generating first subband information for a plurality of subbands in response thereto, quantizing means for forming digital words by adaptively allocating bits to and quantizing said first subband information, wherein bits are adaptively allocated to digital words representing a respective subband and one or two adjacent subbands on the basis of a spectral level in said respective subband, and formatting means for assembling digital information including said digital words into a coded signal having a format suitable for transmission or storage, and said decoder comprising deformatting means for receiving said coded signal and for deriving said digital words therefrom, linearization means for generating second subband information by adaptively allocating bits to and dequantizing said digital words, and inverse subband means for generating a representation of said wideband audio information in response to said second subband information.

17. A system according to claim 16 wherein said subband means comprises means for forming time-domain signal sample blocks in response to said wideband audio information and means for generating analysis-window weighted time-domain signal sample blocks by weighting each of said time-domain signal sample blocks with an analysis window, and wherein said first subband information comprises blocks of frequency-domain transform coefficients grouped into subbands, said transform coefficients generated by applying a discrete transform to said analysis-window weighted time-domain signal sample blocks, and wherein said inverse subband means comprises means for generating time-domain signal sample blocks by applying an inverse discrete transform to said second subband information, and means for cancelling window weighting effects to generate said representation of wideband audio information.

18. A system according to claim 16 wherein said quantizing means further comprises means for estimating relative spectral level of said first subband information in each subband of said plurality of subbands, means for allocating at most a maximum number of bits to first digital words representing a first group of subbands possessing the greatest relative spectral levels and stopping when a certain number of bits has been allocated to each of the first digital words representing said first group of subbands, and means for allocating bits to first digital words representing subbands adjacent to subbands in which each of the first digital words have been allocated said certain number of bits.

19. An encoder according to claim 18 wherein said certain number of bits is equal to said maximum number of bits.

* * * * *